United States Patent
Takahashi et al.

(10) Patent No.: US 10,358,519 B2
(45) Date of Patent: Jul. 23, 2019

(54) MODIFIED POLYCARBODIIMIDE COMPOUND, CURING AGENT, AND THERMOSETTING RESIN COMPOSITION

(71) Applicant: NISSHINBO CHEMICAL INC., Tokyo (JP)

(72) Inventors: Ikuo Takahashi, Ichihara (JP); Takahiko Itoh, Chiba (JP); Takahiro Sasaki, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 0 days.

(21) Appl. No.: 15/563,043

(22) PCT Filed: Mar. 30, 2016

(86) PCT No.: PCT/JP2016/060410
§ 371 (c)(1),
(2) Date: Sep. 29, 2017

(87) PCT Pub. No.: WO2016/163284
PCT Pub. Date: Oct. 13, 2016

(65) Prior Publication Data
US 2018/0066098 A1    Mar. 8, 2018

(30) Foreign Application Priority Data

Apr. 6, 2015 (JP) .................... 2015-077975

(51) Int. Cl.
C08G 18/00 (2006.01)
C08G 18/02 (2006.01)
C08G 18/83 (2006.01)
C08L 63/00 (2006.01)
C08L 101/08 (2006.01)
C08L 79/08 (2006.01)

(52) U.S. Cl.
CPC ........... *C08G 18/025* (2013.01); *C08G 18/83* (2013.01); *C08G 18/833* (2013.01); *C08L 63/00* (2013.01); *C08L 79/08* (2013.01); *C08L 101/08* (2013.01); *C08J 2300/24* (2013.01)

(58) Field of Classification Search
CPC .................................................. C08G 18/025
See application file for complete search history.

(56) References Cited

U.S. PATENT DOCUMENTS 4,067,820 A  1/1978  Wagner et al.
4,294,719 A  10/1981 Wagner et al.
5,576,398 A  11/1996 Takahashi et al.
6,225,417 B1  5/2001  Imashiro et al.
6,300,425 B1  10/2001 Amano et al.

FOREIGN PATENT DOCUMENTS

| EP | 0928825 A2 | 7/1999 |
| JP | 47-24680 | 7/1972 |
| JP | 51-101798 | 9/1976 |
| JP | 51-101918 | 9/1976 |
| JP | 8-81533 A | 3/1996 |
| JP | 10-36469 A | 2/1998 |
| JP | 10-60272 A | 3/1998 |
| JP | 11-60667 A | 3/1999 |
| JP | 11-322899 A | 11/1999 |
| JP | 2000-136231 A | 5/2000 |
| JP | 2007-138080 A | 6/2007 |
| JP | 2007-297491 A | 11/2007 |
| JP | 2013-50549 A | 3/2013 |
| JP | 2013-112755 A | 6/2013 |

OTHER PUBLICATIONS

English Machine Translation of JP H1036469A Obtained Oct. 31, 2018 from https://worldwide.espacenet.com/publicationDetails/biblio?CC=JP&NR=H1036469A&KC=A&FT=D&ND=3&date=19980210&DB=EPODOC&locale=en EP# (Year: 2018).*
International Search Report, issued in PCT/JP2016/060410, dated Jul. 5, 2016.
International Search Report (Form PCT/ISA/210) for International Application No. PCT/JP2016/060411, dated Jul. 5, 2016.
U.S. Appl. No. 15/563,850, filed Oct. 2, 2017.
Extended European Search Report for European Application No. 16776451.3, dated Oct. 26, 2018.

* cited by examiner

*Primary Examiner* — Arrie L Reuther
(74) *Attorney, Agent, or Firm* — Birch, Stewart, Kolasch & Birch, LLP

(57) ABSTRACT

The modified polycarbodiimide compound of the present invention is obtained by modifying a polycarbodiimide compound derived from a diisocyanate compound with an aromatic heterocyclic compound having endocyclic secondary amine nitrogen. The curing agent of the present invention comprises the modified polycarbodiimide compound of the present invention. Thus, a modified polycarbodiimide compound that allows amine dissociation to start at a low temperature as compared with a modified polycarbodiimide compound obtained by modifying a polycarbodiimide compound derived from a diisocyanate compound with diisopropylamine, and a curing agent comprising the modified polycarbodiimide compound can be provided.

13 Claims, No Drawings

MODIFIED POLYCARBODIIMIDE COMPOUND, CURING AGENT, AND THERMOSETTING RESIN COMPOSITION

TECHNICAL FIELD

The present invention relates to a modified polycarbodiimide compound obtained by modifying a polycarbodiimide compound derived from a diisocyanate compound, a curing agent comprising the modified polycarbodiimide compound, and a thermosetting composition comprising the curing agent.

BACKGROUND ART

Polycarbodiimide has been conventionally utilized as an adhesive or a sealing material for an electronic material component or the like because of having high adhesiveness and heat resistance. Such polycarbodiimide is cast in the state of a solution, and thus utilized as an adhesive or a sealing material. Such polycarbodiimide can also be utilized as a curing agent of a resin composition such as a photosensitive resin composition and a curing type aqueous resin composition. Polycarbodiimide, however, has the problems of being low in solubility in various solvents, and also being difficult to store for a long period even in a cold dark place because the state of a solution thereof causes a reaction of a carbodiimide group and aggregation of a polymer to gradually progress, thereby forming gel.

In order to solve such problems, there is known, as a conventional art, a modified polycarbodiimide compound that has very excellent storage stability due to modification of polycarbodiimide derived from an aromatic diisocyanate compound with diisopropylamine (see, for example, PTL1). The modified carbodiimide compound, when cast and then dried, re-produces a carbodiimide group by amine dissociation, thereby exhibiting more excellent adhesiveness or the like. In addition, the modified carbodiimide compound, when used as a curing agent of a resin composition, re-produces a carbodiimide group by amine dissociation during drying, and the carbodiimide group allows a resin composition to be cured.

CITATION LIST

Patent Literature

PTL1: JP 2007-138080 A

SUMMARY OF INVENTION

Technical Problem

Diisopropylamine, however, is high in the temperature at which dissociation from a modified polycarbodiimide starts, and therefore diisopropylamine may not sufficiently dissociate depending on the way of drying and thus cause many modified carbodiimide groups to remain in a polycarbodiimide compound after drying. If any modified carbodiimide group remains in a polycarbodiimide compound after drying, the polycarbodiimide compound after drying may be deteriorated in adhesiveness and/or heat resistance. In addition, when the polycarbodiimide compound is used as a curing agent, curing of a resin composition may be insufficient. Therefore, there is demanded for a modified polycarbodiimide that allows amine dissociation to start at a low temperature as compared with a modified polycarbodiimide obtained by modifying a polycarbodiimide compound derived from a diisocyanate compound with diisopropylamine. An object of the present invention is then to provide a modified polycarbodiimide compound that allows amine dissociation to start at a low temperature as compared with a modified polycarbodiimide compound obtained by modifying a polycarbodiimide compound derived from a diisocyanate compound with diisopropylamine, a curing agent comprising the modified polycarbodiimide compound, and a thermosetting composition comprising the curing agent.

Solution to Problem

The present inventors have made intensive studies for achieving the above object, and as a result, has found that a modified polycarbodiimide compound that allows amine dissociation to start at a low temperature as compared with a modified polycarbodiimide compound obtained by modifying a polycarbodiimide compound derived from a diisocyanate compound with diisopropylamine is obtained by modifying a polycarbodiimide compound derived from a diisocyanate compound with a predetermined aromatic heterocyclic compound being an amine, to thereby complete the present invention.

That is, the present invention is as follows.

[1] A modified polycarbodiimide compound obtained by modifying a polycarbodiimide compound derived from a diisocyanate compound with an aromatic heterocyclic compound having endocyclic secondary amine nitrogen.

[2] The modified polycarbodiimide compound according to [1], wherein the number of endocyclic nitrogen in the aromatic heterocyclic compound is 2 or more.

[3] The modified polycarbodiimide compound according to [1] or [2], wherein the aromatic heterocyclic compound is at least one aromatic heterocyclic compound selected from the group consisting of a pyrazole optionally substituted and an imidazole optionally substituted.

[4] The modified polycarbodiimide compound according to [3], wherein the aromatic heterocyclic compound is at least one aromatic heterocyclic compound selected from the group consisting of 3,5-dimethylpyrazole, 2-methylimidazole, 2-ethyl-4-methyl-imidazole, 2-phenylimidazole and 2-phenyl-4-methylimidazole.

[5] The modified polycarbodiimide compound according to any one of [1] to [4], wherein the diisocyanate compound is an aromatic diisocyanate compound.

[6] The modified polycarbodiimide compound according to [5], wherein the aromatic diisocyanate compound is at least one aromatic diisocyanate compound selected from the group consisting of 4,4'-diphenylmethane diisocyanate, 2,4-tolylene diisocyanate and 2,6-tolylene diisocyanate.

[7] A curing agent comprising the modified polycarbodiimide compound according to any one of [1] to [6].

[8] A thermosetting resin composition comprising a carboxyl group-containing resin having a carboxyl group in a molecule or an epoxy resin having two or more epoxy groups in one molecule, and 0.5 to 1.5 equivalents of the curing agent according to [7], based on the equivalent of a functional group in the resin.

[9] The thermosetting resin composition according to [8], wherein the carboxyl group-containing resin is at least one resin selected from the group consisting of a polyurethane resin, a polyamide resin, an acrylic resin, a vinyl acetate resin, a polyolefin resin and a polyimide resin.

Advantageous Effects of Invention

The present invention can provide a modified polycarbodiimide compound that allows amine dissociation to start at a low temperature as compared with a modified polycarbodiimide compound obtained by modifying a polycarbodiimide compound derived from a diisocyanate compound with diisopropylamine, a curing agent comprising the modified polycarbodiimide compound, and a thermosetting composition comprising the curing agent.

DESCRIPTION OF EMBODIMENTS

[Modified Polycarbodiimide Compound]

The Modified Polycarbodiimide Compound of the Present Invention is obtained by modifying a polycarbodiimide compound derived from a diisocyanate compound with an aromatic heterocyclic compound having endocyclic secondary amine nitrogen.

(Aromatic Heterocyclic Compound)

The aromatic heterocyclic compound for use in the modified polycarbodiimide compound of the present invention is not particularly limited as long as it is an aromatic heterocyclic compound having endocyclic secondary amine nitrogen. Here, the aromatic heterocyclic compound having endocyclic secondary amine nitrogen refers to an aromatic heterocyclic compound having an amine in a heterocyclic ring. From the viewpoint of low dissociation starting temperature of an aromatic heterocyclic compound from the modified polycarbodiimide compound, the aromatic heterocyclic compound having endocyclic secondary amine nitrogen is preferably an aromatic heterocyclic compound having a number of endocyclic nitrogen of 2 or more, and is more preferably at least one aromatic heterocyclic compound selected from the group consisting of a pyrazole optionally substituted and an imidazole optionally substituted, further preferably at least one aromatic heterocyclic compound selected from the group consisting of 3,5-dimethylpyrazole, 2-methylimidazole, 2-ethyl-4-methyl-imidazole, 2-phenylimidazole and 2-phenyl-4-methylimidazole.

For example, when the aromatic heterocyclic compound having endocyclic secondary amine nitrogen is 3,5-dimethylpyrazole, a polycarbodiimide compound derived from a diisocyanate compound, having a carbodiimide group of formula (1), is modified with 3,5-dimethylpyrazole, thereby forming a modified carbodiimide group of formula (2). When 3,5-dimethylpyrazole then dissociates, the modified carbodiimide group is turned back to the carbodiimide group of formula (1), high in reactivity.

—N═C═N— (1)

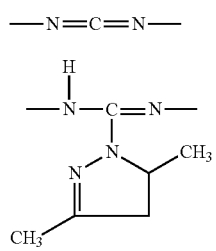

(2)

(Polycarbodiimide Compound)

The polycarbodiimide compound for use in the modified polycarbodiimide compound of the present invention is a polycarbodiimide compound derived from a diisocyanate compound, preferably a polycarbodiimide compound derived from an aromatic diisocyanate compound. The diisocyanate compound here refers to an isocyanate compound having two isocyanate groups present in a molecule, and the aromatic diisocyanate compound here refers to an isocyanate compound in which two isocyanate groups present in a molecule are directly bound to an aromatic ring. Examples of the polycarbodiimide compound derived from a diisocyanate compound include a polycarbodiimide compound derived from an aromatic diisocyanate compound and a polycarbodiimide compound derived from an aliphatic diisocyanate compound. The polycarbodiimide compound derived from an aromatic diisocyanate compound is excellent in heat resistance as compared with the polycarbodiimide compound derived from an aliphatic diisocyanate compound, and therefore the polycarbodiimide compound derived from an aromatic diisocyanate compound is preferable.

The polycarbodiimide compound derived from a diisocyanate compound has a group represented by the following general formula (3), for example:

 (3)

wherein R represents a residue obtained by removing an isocyanate group from a diisocyanate compound.

Examples of the aromatic diisocyanate compound from which the polycarbodiimide compound for use in the modified polycarbodiimide compound of the present invention is derived include 4,4'-diphenylmethane diisocyanate, 4,4'-diphenyl ether diisocyanate, p-phenylene diisocyanate, m-phenylene diisocyanate, 3,3'-dimethoxy-4,4'-biphenyl diisocyanate, o-tolidine diisocyanate, naphthylene diisocyanate, 2,4-tolylene diisocyanate, 2,6-tolylene diisocyanate, 3,3'-dimethyl-4,4'-diphenyl ether diisocyanate and 3,3'-dimethyl-4,4'-diphenyl ether diisocyanate. These may be used singly or in combinations of two or more thereof. A preferable aromatic diisocyanate compound is at least one selected from the group consisting of 4,4'-diphenylmethane diisocyanate, 2,4-tolylene diisocyanate and 2,6-tolylene diisocyanate in terms of heat resistance.

(Polycarbodiimide Copolymer)

The polycarbodiimide for use in the present invention may be an aromatic polycarbodiimide copolymer that is synthesized with at least one aromatic diisocyanate compound as a raw material and that has at least two carbodiimide groups in a molecule.

The copolymer can be obtained by copolymerizing an aromatic polycarbodiimide with, for example, polyether polyol, polyester polyol, polycarbonate polyol, or polybutadiene diol.

(Method for Producing Polycarbodiimide Compound)

The polycarbodiimide compound for use in the modified polycarbodiimide compound of the present invention can be produced by various methods where a diisocyanate compound is used as a raw material. Examples include a method in which the aromatic diisocyanate compound is subjected to a decarboxylation condensation reaction accompanied with decarbonation, to produce an isocyanate-terminated polycarbodiimide (U.S. Pat. No. 2,941,956 B, JP 47-33279 B, J. Org. Chem, 28, 2069-2075 (1963), Chemical Review 1981, Vol. 81, No. 4, pp. 619-621).

The decarbonation condensation reaction of the above described aromatic diisocyanate compound progresses in the presence of a carbodiimidation catalyst. Examples of the carbodiimidation catalyst can include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers thereof, and, among them, 3-methyl-1-phenyl-2-phospholene-1-oxide is suitable in terms of reactivity. The amount of the carbodiimidation catalyst is usually 0.1 to 1.0% by mass relative to the aromatic diisocyanate compound for use in carbodiimidation.

The decarboxylation condensation reaction of the aromatic diisocyanate compound can be performed in no solvent or in a solvent. Examples of the solvent that can be used include alicyclic ethers such as tetrahydroxyfuran, 1,3-dioxane and dioxolane: aromatic hydrocarbons such as benzene, toluene, xylene and ethylbenzene: halogenated hydrocarbons such as chlorobenzene, dichlorobenzene, trichlorobenzene, perchlene, trichloroethane and dichloroethane: ester-based solvents such as ethyl acetate and butyl acetate: and ketone-based solvents such as methyl ethyl ketone, methyl isobutyl ketone and cyclohexanone. These may be used singly or in combinations of two or more thereof. Among them, cyclohexanone and tetrahydroxyfuran are preferable.

The temperature in the above described decarboxylation condensation reaction is not particularly limited, and it is preferably 40 to 200° C., more preferably 50 to 130° C. When the reaction is performed in the solvent, the temperature is preferably 40° C. to the boiling point of the solvent. In addition, when the reaction is performed in the solvent, the concentration of the aromatic diisocyanate compound is preferably 5 to 55% by mass, more preferably 5 to 40% by mass. When the concentration of the aromatic diisocyanate compound is 5% by mass or more, a so long time for polycarbodiimide synthesis is not taken, and when the concentration is 55% by mass or less, gelation during the reaction can be suppressed. In addition, the solid content concentration during the reaction is preferably 5 to 55% by mass, more preferably 20 to 50% by mass based on the total amount of the reaction system.

(End-Capping of Aromatic Polycarbodiimide)

In the present invention, the polycarbodiimide can be used in which the degree of polymerization is controlled to a proper value by use of a compound that reacts with an end isocyanate group of the polycarbodiimide, such as monoisocyanate.

Examples of the monoisocyanate that can be used to cap the end of the polycarbodiimide to control the degree of polymerization include phenyl isocyanate, p- and m-tolyl isocyanates, and p-isopropylphenyl isocyanate. In particular, phenyl isocyanate is suitably used.

In addition to the above, a compound that can serve as a capping agent to react with end isocyanate can be methanol, isopropyl alcohol, phenol, polyethylene glycol monomethyl ether or the like bearing a hydroxy group: butylamine, diethylamine or the like bearing an amino group: or propionic acid, benzoic acid, acid anhydride or the like bearing a carboxyl group.

(Modification of Polycarbodiimide Compound with Aromatic Heterocyclic Compound)

As described above, the modified polycarbodiimide compound of the present invention is obtained by modifying a polycarbodiimide compound with an aromatic heterocyclic compound having endocyclic secondary amine nitrogen. Modification of the polycarbodiimide compound with an aromatic heterocyclic compound having endocyclic secondary amine nitrogen can be, for example, performed as follows. While modification of the polycarbodiimide compound with an aromatic heterocyclic compound having endocyclic secondary amine nitrogen can also be performed in no solvent, such synthesis can also be performed by mixing the polycarbodiimide compound with an organic solvent, adding an aromatic heterocyclic compound having endocyclic secondary amine nitrogen thereto so that a predetermined equivalent relative to the carbodiimide group is achieved, and stirring and reacting the resultant.

In the case where the organic solvent is used, the amount of an aromatic heterocyclic compound having endocyclic secondary amine nitrogen added is preferably 1 to 2 equivalents based on 1 equivalent of the carbodiimide group, and is more preferably 1 to 1.2 equivalents from the viewpoints that the amount of an aromatic heterocyclic compound having endocyclic secondary amine nitrogen is not excessive and the amine is easily escaped in a heating treatment. In addition, the reaction temperature in modification of the polycarbodiimide compound with an aromatic heterocyclic compound having endocyclic secondary amine nitrogen is preferably ordinary temperature (about 25° C.) or 40 to 80° C. from the viewpoints of the reaction speed and suppression of a side reaction in the modification. The modification of the polycarbodiimide compound with an aromatic heterocyclic compound having endocyclic secondary amine nitrogen is preferably performed with stirring, and the reaction time, which varies depending on the temperature, is preferably about 0.1 to 10 hours.

(Curing Agent)

The curing agent of the present invention comprises the modified polycarbodiimide compound of the present invention. Thus, the curing agent of the present invention can be used, thereby drying the resin composition and ensuring curing of a resin composition, at the same time.

The curing agent of the present invention can cure a resin composition which is reacted with and cross-linked to a carbodiimide group. Examples of such a resin composition include a carboxyl group-containing resin having a carboxyl group in a molecule and an epoxy resin having 2 or more epoxy groups in a molecule. A preferable carboxyl group-containing resin composition is at least one resin selected from the group consisting of a polyurethane resin, a polyamide resin, an acrylic resin, a vinyl acetate resin, a polyolefin resin and a polyimide resin, from the viewpoint of easiness of the crosslinking reaction with a carbodiimide group.

[Thermosetting Composition]

The thermosetting resin composition of the present invention comprises a carboxyl group-containing resin having a carboxyl group in a molecule or an epoxy resin having 2 or more epoxy groups in one molecule, and the curing agent of the present invention. Thus, the thermosetting resin composition can be stored for a long period, and can also be dried by heat and at the same time certainly cured in use thereof. The carboxyl group-containing resin for use in the thermosetting resin composition of the present invention is at least one resin selected from the group consisting of a polyurethane resin, a polyamide resin, an acrylic resin, a vinyl acetate resin, a polyolefin resin and a polyimide resin.

The content of the curing agent in the thermosetting resin composition of the present invention is, for example, 0.5 to 1.5 equivalents, preferably 0.8 to 1.2 equivalents based on the functional group equivalent of the main agent (the above described resin). If the content of the curing agent is less than 0.5 equivalents, curing of the resin may be insufficient. In addition, even if the content of the curing agent is more than 1.5 equivalents, the effect as the curing agent is not significantly changed. The thermosetting composition of the present invention can contain, if necessary, appropriately compounded various additive components such as a pigment, a filler, a leveling agent, a surfactant, a dispersant, a plasticizer, an ultraviolet absorber, and an antioxidant, depending on the intended use and the like.

A coating film can be obtained by application of the thermosetting resin composition of the present invention to a predetermined substrate to form a coating layer. In such a case, a conventionally known method can be appropriately used as a coating method, and for example, brush coating, coating with a wad, spray coating, hot spray coating, airless spray coating, roller coating, curtain flow coating, flow coating, dip coating, and knife-edge coating can be used. After formation of the coating layer, a heating treatment can also be performed in order to promote the crosslinking reaction. The heating treatment method is not particularly limited, and for example, a method in which an electric heating furnace, an infrared heating furnace, a high-frequency furnace, or the like is used can be adopted.

[Other Applications of Modified Polycarbodiimide Compound of Present Invention]

The modified polycarbodiimide compound of the present invention can also be used as a curing accelerator of the thermosetting resin composition. Thus, a curing accelerator that can be stored for a long time can be obtained. For example, the modified polycarbodiimide compound of the present invention can be used as a curing accelerator of an epoxy resin composition. Examples of the modified polycarbodiimide compound that can be used as the curing accelerator of an epoxy resin include a modified polycarbodiimide compound obtained by modifying a polycarbodiimide compound with 2-ethyl-4-methylimidazole, a modified polycarbodiimide compound obtained by modifying a polycarbodiimide compound with 2-phenylimidazole, and a modified polycarbodiimide compound obtained by modifying a polycarbodiimide compound with 2-phenyl-4,5-dihydroxymethylimidazole.

EXAMPLES

Hereinafter, the present invention will be more specifically described with reference to Examples and Comparative Examples, but the present invention is not intended to be limited thereto. It is noted that "%" in the context is on a mass basis hereinafter, unless particularly noted.

[Production of Modified Polycarbodiimide Compound]

A modified polycarbodiimide compound of each of Examples and Comparative Examples was produced as described below.

Synthesis Example 1

A reaction vessel equipped with a reflux tube and a stirrer was charged with 100 parts by mass of tolylene diisocyanate (composition: 80% of 2,4-tolylene diisocyanate and 20% of 2,6-tolylene diisocyanate), 71.8 parts by mass of a polyalkylene carbonate diol (produced by Asahi Kasei Chemicals Corporation, DURANOL T-5651, molecular weight: 1000), 17.1 parts by mass of phenyl isocyanate, 245 parts by mass of cyclohexanone, and 1.0 part by mass of a carbodiimidation catalyst (3-methyl-1-phenyl-2-phospholene-1-oxide), and the resultant was stirred under a nitrogen stream at 100° C. for 3 hours. It was confirmed from the results of measurement of infrared (IR) absorption spectrum that an absorption peak attributed to an isocyanate group at a wavelength of about 2270 $cm^{-1}$ almost disappeared and that an absorption peak attributed to a carbodiimide group at a wavelength of about 2150 $cm^{-1}$ was observed, and a polycarbodiimide compound of Synthesis Example 1 was obtained.

Example 1

The polycarbodiimide compound obtained in Synthesis Example 1, in the state of being still placed in the reaction vessel, was cooled to 50° C., and 56.3 parts by mass of 3,5-dimethylpyrazole was added thereto and stirred for 5 hours. It was confirmed from the results of measurement of infrared (IR) absorption spectrum that an absorption peak attributed to a guanidine group at a wavelength of about 1660 $cm^{-1}$ appeared and that an absorption peak attributed to a carbodiimide group at a wavelength of about 2150 $cm^{-1}$ almost disappeared, and a modified polycarbodiimide compound of Example 1 was obtained.

Example 2

A polycarbodiimide compound of Example 2 was obtained in the same manner as in the modified polycarbodiimide compound of Example 1 except that the amine added was changed to 48.1 parts by mass of 2-methylimidazole.

Example 3

A polycarbodiimide compound of Example 3 was obtained in the same manner as in the modified polycarbodiimide compound of Example 1 except that the amine added was changed to 64.6 parts by mass of 2-ethyl-4-methylimidazole.

Example 4

A polycarbodiimide compound of Example 4 was obtained in the same manner as in the modified polycarbodiimide compound of Example 1 except that the amine added was changed to 84.5 parts by mass of 2-phenylimidazole.

Example 5

A polycarbodiimide compound of Example 5 was obtained in the same manner as in the modified polycarbodiimide compound of Example 1 except that the amine added was changed to 92.7 parts by mass of 2-phenyl-4-methylimidazole.

Comparative Example 1

A polycarbodiimide compound of Comparative Example 1 was obtained in the same manner as in the modified polycarbodiimide compound of Example 1 except that the amine added was changed to 63.8 parts by mass of diisopropylamine.

[Evaluation of Modified Polycarbodiimide Compound]
(Dissociation Property of Amine)

The modified polycarbodiimide compound of each of Examples 1 to 5 and Comparative Example 1 was heated at 170° C. for 5 minutes, and the modified polycarbodiimide compound after a lapse of 5 minutes from the start of heating was subjected to measurement of infrared (IR) absorption spectrum. The peak intensity of an absorption peak attributed to a carbodiimide group at a wavelength of about 2150 $cm^{-1}$ in the infrared spectrum obtained by the measurement was then examined. The peak intensity examined was divided by the peak intensity of an absorption peak attributed to a carbodiimide group in the polycarbodiimide compound before modification with the amine, thereby calculating the proportion (%) of the peak intensity of a peak attributed to a carbodiimide group, which appeared by dissociation of the amine after heating, to calculate the dissociation property of the amine in the modified polycarbodiimide compound. When the value of the dissociation property is 100%, it can be presumed that all modified carbodiimide groups are converted to carbodiimide groups by dissociation of the amine. Here, infrared (IR) absorption spectrum analysis was performed by using FT-IR 8200PC (manufactured by Shimadzu Corporation).

(Dissociation Starting Temperature of Amine)

The modified polycarbodiimide compound of each of Examples 1 to 5, and Comparative Example 1 was heated at each temperature of 50 to 120° C. for 15 minutes, and the modified polycarbodiimide compound heated was subjected to measurement of infrared (IR) absorption spectrum. The presence of an absorption peak attributed to a carbodiimide group at a wavelength of about 2150 cm$^{-1}$ in the infrared spectrum obtained by the measurement was then examined. When no absorption peak attributed to a carbodiimide group was observed, the amine was determined not to dissociate at the heating temperature yet, and when an absorption peak attributed to a carbodiimide group was observed, the amine was determined to dissociate at the heating temperature. The lowest temperature of the heating temperature at which the amine was determined to dissociate was then defined as the dissociation starting temperature.

(Curing Temperature in Heating for 10 Minutes and the Curing Temperature in Heating for 1 Hour)

The modified polycarbodiimide compound (the equivalent of NCN: 134) of each of Examples 1 to 5, and Comparative Example 1, and a carboxyl group-containing polyurethane resin (the equivalent of COOH: 1100) were mixed so that the equivalent of NCN: the equivalent of COOH=1:1 was satisfied, thereby preparing a thermosetting resin composition. Next, the thermosetting resin composition was cast on a release PET film, dried at 100° C. for 5 minutes, and thereafter heated at each temperature of 80 to 150° C. for 10 minutes and 1 hour, to produce a film having a thickness of about 20 μm. A dynamic viscoelasticity measurement apparatus (DMA) (manufactured by SII Nano-Technology Inc., trade name: DMS6100) was then used to examine curing of the film. When the glass transition temperature of the film, measured by the dynamic viscoelasticity measurement apparatus (DMA), was 80° C. or more, the film was determined to be cured. The respective lowest temperatures of the heating temperature at which the thermosetting resin composition was cured were defined as the curing temperature in heating for 10 minutes and the curing temperature in heating for 1 hour.

[Evaluation Results]

The evaluation results of the modified polycarbodiimide compound of each of Examples 1 to 5, and Comparative Example 1 are shown in Table 1.

It was found from evaluation of the dissociation property of the above described amine and evaluation of the dissociation starting temperature of the amine that the aromatic heterocyclic compound used for modification of the modified polycarbodiimide compound of each of Examples 1 to 5, namely, at least one aromatic heterocyclic compound selected from the group consisting of 3,5-dimethylpyrazole, 2-methylimidazole, 2-ethyl-4-methylimidazole, 2-phenylimidazole and 2-phenyl-4-methylimidazole started to dissociate from the modified polycarbodiimide compound at a low temperature and was high in dissociation property as compared with diisopropylamine. In addition, it was found from evaluation of the above described curing temperature in heating for 10 minutes and the curing temperature in heating for 1 hour that the modified polycarbodiimide compound of each of Examples 1 to 5, when used as a curing agent, could allow a resin to be cured in a short time and also allow a resin to be cured at a low temperature, as compared with diisopropylamine.

INDUSTRIAL APPLICABILITY

The modified polycarbodiimide composition of the present invention has solution storage stability, high adhesion strength and high heat resistance, and therefore is suitably used as a material for various electronic component applications, such as a base film and/or a coverlay film for a wiring board, or an adhesion film. In particular, a modified polycarbodiimide copolymer further has flexibility and also is excellent in flex resistance (folding resistance), and therefore can be suitably used for a base film and/or a coverlay film for a flexible wiring board. In addition, the modified polycarbodiimide compound of the present invention and the curing agent of the present invention are also useful as a curing agent or a curing accelerator of a resin composition such as a photo-sensitive resin composition and a curing type aqueous resin composition.

The invention claimed is:

1. A modified polycarbodiimide compound obtained by modifying a polycarbodiimide compound derived from a diisocyanate compound with an aromatic heterocyclic compound having endocyclic secondary amine nitrogen in an amount of 1 to 2 equivalents with respect to 1 equivalent of carbodiimide group of the polycarbodiimide compound.

2. The modified polycarbodiimide compound according to claim 1, wherein the number of endocyclic nitrogen in the aromatic heterocyclic compound is 2 or more.

3. The modified polycarbodiimide compound according to claim 1, wherein the aromatic heterocyclic compound is at least one aromatic heterocyclic compound selected from

TABLE 1

Evaluation results of modified polycarbodiimide compound of each of Examples 1 to 5 and Comparative Example 1

| | Example 1 | Example 2 | Example 3 | Example 4 | Example 5 | Comparative Example 1 |
|---|---|---|---|---|---|---|
| Amine | 3,5-Dimethylpyrazole | 2-Methylimidazole | 2-Ethyl-4-methylimidazole | 2-Phenylimidazole | 2-Phenyl-4-methylimidazole | Diisopropylamine |
| Dissociation property | 100% | 100% | 100% | 100% | 100% | 7% |
| Dissociation starting temperature | 70° C. | 80° C. | 80° C. | 90° C. | 90° C. | 110° C. |
| Curing temperature in heating for 10 minutes | 100° C. | 80° C. | 80° C. | 90° C. | 90° C. | Not cured |
| Curing temperature in heating for 1 hour | 110° C. | 80° C. | 80° C. | 90° C. | 90° C. | 120° C. | the group consisting of a pyrazole optionally substituted and an imidazole optionally substituted.

4. The modified polycarbodiimide compound according to claim 3, wherein the aromatic heterocyclic compound is at least one aromatic heterocyclic compound selected from the group consisting of 3,5-dimethylpyrazole, 2-methylimidazole, 2-ethyl-4-methyl-imidazole, 2-phenylimidazole and 2-phenyl-4-methylimidazole.

5. The modified polycarbodiimide compound according to claim 1, wherein the diisocyanate compound is an aromatic diisocyanate compound.

6. The modified polycarbodiimide compound according to claim 5, wherein the aromatic diisocyanate compound is at least one aromatic diisocyanate compound selected from the group consisting of 4,4'-diphenylmethane diisocyanate, 2,4-tolylene diisocyanate and 2,6-tolylene diisocyanate.

7. A curing agent comprising the modified polycarbodiimide compound according to claim 1.

8. A thermosetting resin composition comprising:
a carboxyl group-containing resin having a carboxyl group in a molecule or an epoxy resin having two or more epoxy groups in one molecule; and
0.5 to 1.5 equivalents of the curing agent according to claim 7, based on the equivalent of a functional group in the resin.

9. The thermosetting resin composition according to claim 8, wherein the carboxyl group-containing resin is at least one resin selected from the group consisting of a polyurethane resin, a polyamide resin, an acrylic resin, a vinyl acetate resin, a polyolefin resin and a polyimide resin.

10. The modified polycarbodiimide compound according to claim 1, wherein the aromatic heterocyclic compound is an aromatic heterocyclic compound having endocyclic secondary amine nitrogen and at least one substituent.

11. The modified polycarbodiimide compound according to claim 1, wherein the aromatic heterocyclic compound is an aromatic heterocyclic compound having endocyclic secondary amine nitrogen and two or more substituents.

12. The modified polycarbodiimide compound according to claim 1, wherein the aromatic heterocyclic compound is an aromatic heterocyclic compound which has an imidazole structure and at least one substituent at a 2-positon of the imidazole structure.

13. The modified polycarbodiimide compound according to claim 1, wherein the aromatic heterocyclic compound is at least one aromatic heterocyclic compound selected from the group consisting of 2-methylimidazole and 2-ethyl-4-methyl-imidazole.

* * * * *